March 6, 1962 G. E. McGUIRE ETAL 3,023,914
HYDRAULICALLY ACTUATED DERRICK ATTACHMENT FOR VEHICLES
Original Filed Aug. 3, 1955 2 Sheets-Sheet 2
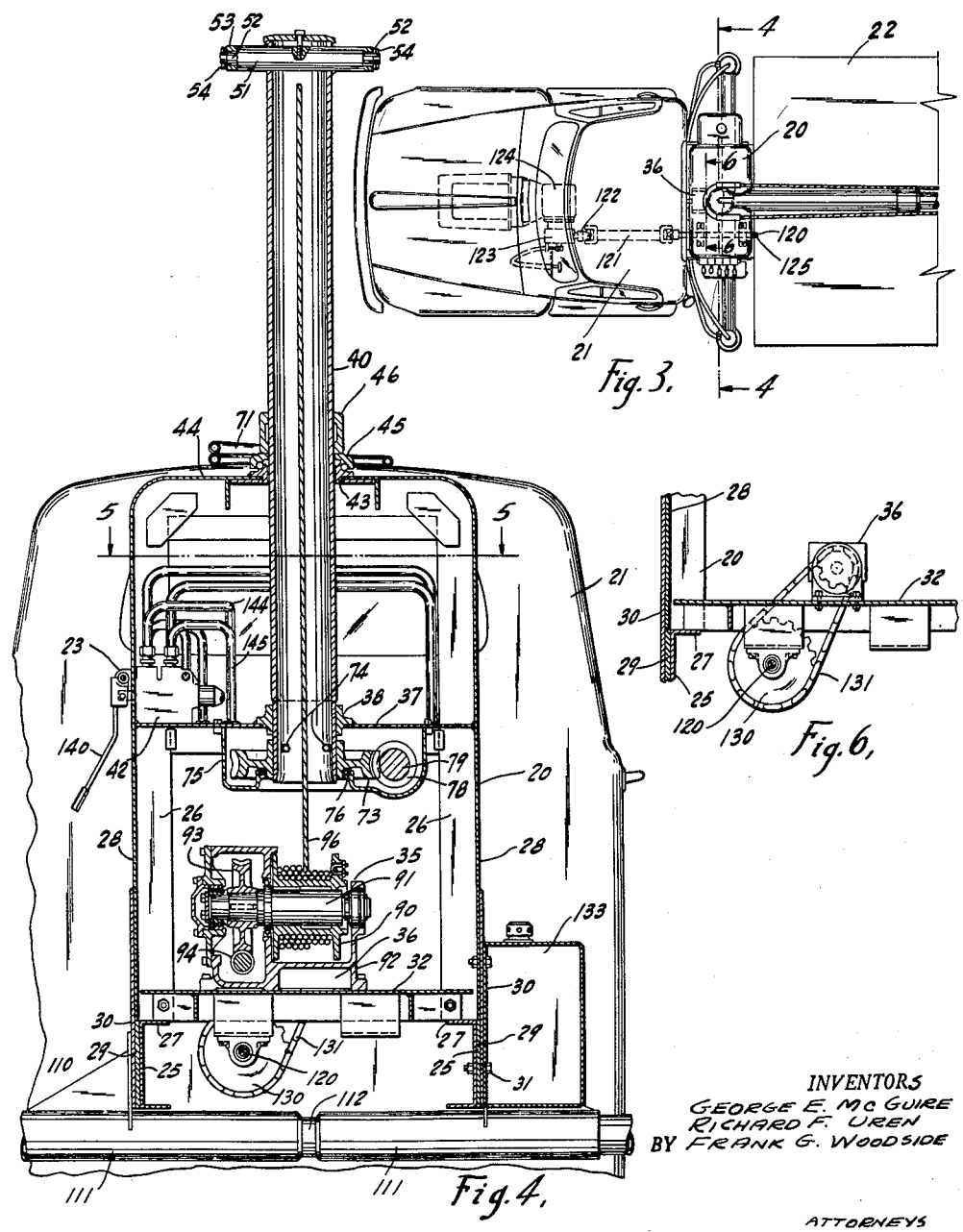
INVENTORS
GEORGE E. MCGUIRE
RICHARD F. UREN
BY FRANK G. WOODSIDE
ATTORNEYS United States Patent Office 3,023,914
Patented Mar. 6, 1962

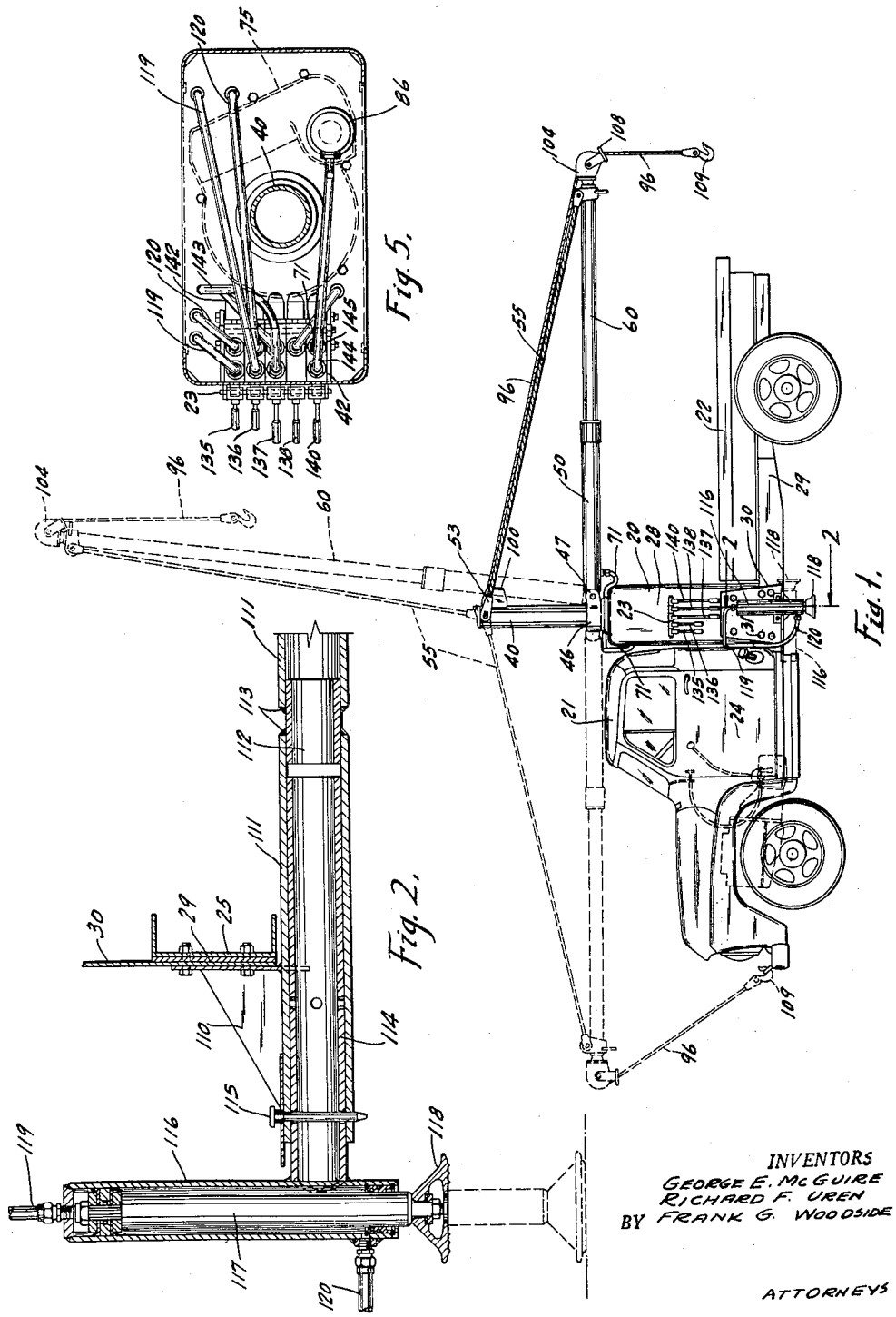

3,023,914
HYDRAULICALLY ACTUATED DERRICK
ATTACHMENT FOR VEHICLES
George E. McGuire, Richard F. Uren, and Frank G. Woodside, Milwaukee, Wis., assignors, by mesne assignments, to L. A. Young Spring & Wire Corporation, Detroit, Mich., a corporation of Michigan
Original application Aug. 3, 1955, Ser. No. 526,125, now Patent No. 2,923,418, dated Feb. 2, 1960. Divided and this application Mar. 9, 1959, Ser. No. 800,360
3 Claims. (Cl. 212—145)

This invention relates to a hydraulically actuated jack for vehicles.

This application is a division of application Serial Number 526,125, filed August 3, 1955 and now Patent Number 2,923,418.

A major feature of the device is concerned with its unitary organization. The entire structure is mounted upon and within a frame having the form of an inverted U, the legs of which are designed to rest at the end directly upon the vehicle frame and have extensions straddling the vehicle frame and connected therewith for rigid support. The attachment frame has the form of a broad channel in all cross sections not only for strength, but for weight distribution and stability of mounting on the frame of a truck or trailer to which it is applied. The organization is such that power can be derived from any appropriate power take-off and applied to a pump mounted on the attachment frame.

The entire organization is carried by the attachment frame including a mast and boom; the aforesaid pump and its driving connections and the oil tank from which the pump derives hydraulic fluid; a hydraulic motor which rotates the mast and the motion transmitting connections from the motor to the mast; a winch and the hydraulic motor connections for its operation; an extensible section of the boom and the hydraulic connections for its actuation; hydraulic steadying jacks for ground engagement at opposite sides of the vehicle and the supports upon which the jacks are pivotal between retracted and operative positions and the connections for operating and retracting the jack rams; and the controls whereby the operation of all of the operating parts is subject to direct and convenient control by the operator. Application of the box frame of the attachment to the frame of the vehicle serves, in a single operation, to make all of the parts instantly available for use, subject only to the connection to the vehicle power take-off.

The steadying jacks are mounted on the outsides of the legs of the inverted U-shaped attachment frame or horizontal and laterally projecting studs which permit the jacks to be rotated bodily between horizontal positions for transportation and vertical positions for use. Each jack includes an extensible ram permanently connected with the hydraulic system of the attachment to be extended and retracted as desired by the operator. With the arms extended, support is provided for the entire vehicle directly beneath the attachment frame and mast, and the mast and boom are steadied against tilting as the boom swings laterally during operation.

Further particulars of the structure broadly outlined will be found in the accompanying drawings in which:

FIG. 1 is a view in side elevation of the attachment of the present invention as it appears mounted on the frame of a truck.

FIG. 2 is an enlarged view taken in section on line 2—2 of FIG. 1.

FIG. 3 is a view fragmentarily illustrating the device of FIG. 1 as it appears in plan.

FIG. 4 is a view on an enlarged scale taken in section on the line 4—4 of the FIG. 3.

FIG. 5 is a view taken in section on the line 5—5 of FIG. 4.

FIG. 6 is a view taken in section on an enlarged scale on the line 6—6 of FIG. 3.

Since the unitary attachment of the present invention can be mounted in any desired position on a truck or trailer frame, the mounting shown in FIGS. 1 to 4 is to be regarded as generically representative. It does, however, have definite advantages in the particular installation shown, since the attachment frame 20 is located between the truck cab 21 and bed 22 where the control set generically designated by reference character 23, are conveniently adjacent to the cab door 24.

The vehicle frame conventionally comprises a pair of laterally spaced channels 25 as shown in FIG. 4. The attachment frame is of U-shaped form in front and rear elevation and is channeled in cross section, having flanges 26 which are at least as deep as the flanges 27 of the vehicle frame channels 25, so that the ends of the legs of the inverted U-shaped attachment frame rest directly upon, and are supported directly from, the frame channels 25.

The web portions 28 of the channels comprising the attachment frame 20 are very broad, as clearly appears in FIG. 1, therewith contributing to the stability of the mounting. Plates 29 may be attached to the splicing extensions 30 which extend downwardly outside of the vehicle frame and are connected thereto in any desired manner as by bolts 31. (FIG. 4). The plates 29, through which the attaching bolts 31 extend, reinforce the vehicle frame as well as serving as shims between the splicing plates 30 of the vehicle frame to assure a rigid connection.

The attachment frame is provided with lateral shelves or supports at two levels. There is a heavy bed shelf at 32 near the bottom of the attachment frame which is bolted to the lower ends of the legs 26 of the attachment frame and may rest directly on the flanges 27 of the vehicle frame. Upon the bed shelf 32 are mounted the winch 35 and the hydraulic pump 36 and the actuating connections therefor as hereinafter described. Upon the intermediate shelf or platform 37 are mounted the lower bearing 38 for the mast 40 and the motor and driving connections for rotating the mast as hereinafter described. Also mounted on shelf 37, and the outside of one of the legs 26 of the attachment frame, is the valve casing 42 from which the supply and the various control connections lead to the controlled parts.

Each of the splicing plates 30 is provided, as best shown in FIG. 2, with a bracket 110 which supports a sleeve 111 disposed transversely of the vehicle frame. The sleeves 111, extending from opposite sides of the frame, are desirably cut to be spaced somewhat from each other, as best shown in FIG. 2, and are connected by a tubular dowel 112 to which they are welded at 113. This part of the installation is the only one requiring any welding for the mounting of the attachment to the truck.

Telescopically adjustable in the respective sleeves 111 are extension sleeves 114, which may be projected laterally to any desired extent from the truck frame and may be anchored in desired positions of extension and rotative adjustment by means of rotatable pins 115, also shown in FIG. 2. Pins 115 are inserted through any of a series of holes in sleeve 114, which are positioned axially along sleeve 114 and are also provided in both vertical and horizontal planes so that a single adjustment serves to position the sleeves 114 both axially and pivotally. At their ends, the telescopically extensible and rotatable sleeves 114 carry the jack cylinders 116, within which the rams 117 are hydraulically extensible to engage the feet 118 with the surface of the earth beside the truck, to contribute to the support and the bracing of the truck frame during the use of the hoist. The rams are double acting within their respective cylinders 116, having extension pressure pipe connection at 119 and retraction pipe connection at 120. The rams are normally carried in the horizontal position shown in dotted lines in FIG. 1 during movement of the truck on the highway, but they are rotated to upright positions shown in full lines in FIG. 1 prior to use of the equipment.

Also mounted on the bed plate 32 of the attachment frame 20 are pillow blocks for a drive shaft 120. (See FIGS. 3 and 4.) This shaft is connected in any appropriate manner, as by the universally jointed driving shaft 121, with the shaft 122 of the power take-off 123 of the truck transmission 124. It will be observed that the remote end of shaft 120 is exposed at 125 (FIG. 3), so that any other device requiring power for its operation may be driven through the same power take-off. This may include another hoist of construction identical to that already described and mounted either on the same vehicle or on a trailer.

The sprocket 130 mounted on shaft 120 is connected by chain 131 with the pump 36 to supply the hydraulic power for the operation of the various devices disclosed. The pump 36 pumps hydraulic liquid from a supply reservoir 133, mounted on one of the splicing plates 30, desirably at the side of the vehicle opposite that on which the control set 23 is mounted to the attachment frame 20. The valve levers arranged to control the valves (not shown) in the control housing 42, include a lever 135, for the left stabilizing jack 116, 117; a lever 136 for the right stabilizing jack. In general, the arrangement is correlated with those parts which are raised or lowered hydraulically so that the raising of the lever will raise the controlled part and the lowering of the lever beyond its neutral or intermediate position will lower the controlled part. Thus, levers 135 and 136 are raised to retract the rams 117 of their respective jacks and lowered to lower such rams.

In the neutral position of the several levers, all valves are closed, whereby the parts are held fixed in the positions to which they have been moved. It will be observed in FIG. 5 that two pressure and relief connections 119 and 120 are supplied to the respective stabilizing jacks.

With the exception of the stabilizing jacks, use of which may be optional in many cases, no mounting work is required other than the positioning of the attachment frame 20 on the vehicle frame with the splicing extensions of its legs straddling the frame and connected therewith. However, the connection of the jack bearing sleeves to each other beneath the frame provides an extremely strong rigidifying support for the frame as well as for the attachment. It may be noted that when the jacks are in use, each may be extended to any desired degree of projection, independently of the other, so that the vehicle and attachment will be stabilized regardless of ground surface levels.

The unitary mounting of the apparatus upon and within the attachment frame not only greatly expedites the mounting and dismounting with respect to a vehicle frame, but it is noteworthy that the attachment frame as shown is actually outside of, and in weather protective relation to, much of the mechanism so that, quite apart from any other housing element, it acts as a partial housing for the hydraulic motors and driving connections.

We claim:
1. In a device of the character described including a vehicle frame, a unitary hoist adapted to be mounted on said frame and comprising a box frame having lower portions seated upon the vehicle frame and having splicing means straddling the vehicle frame and connected therewith at a level below the box frame, hydraulic jack means mounted on said splicing means including extensible rams provided with supporting feet, a hydraulic pump mounted on said frame, valve controlled means carried by said frame for connecting the pump with respective jack means for the selective operation of their rams, and a mounting bracket on which said rams may be pivoted on a horizontal axis to and from operative position normal to the ground and on which said rams are movable laterally with respect to said frame simultaneously with said pivotal movement.

2. In a hoist attachment for a vehicle, the combination with a unitary hoist having a frame mounted on the vehicle, a pair of jacks connected with the hoist frame and disposed at opposite sides of the vehicle, each of said jacks including a mounting extending beneath the adjacent portion of the vehicle and the respective mountings of said jacks having a cross connection with each other beneath said vehicle portions, each said jack comprising a cylinder pivoted to its mounting for movement between upright and horizontal positions and between laterally extended laterally retracted positions and an extensible ram telescopically associated with the cylinder and provided with a bearing foot and flexible pressure connections to the respective cylinders for extending the respective rams and accommodating pivotal and lateral movement of the cylinders between operative and inoperative positions.

3. In a device of the character described the combination with a hoist having a frame adapted for mounting on a vehicle having a frame, the hoist frame having extensions for connection with the vehicle frame which project to a level below the vehicle frame upon which the hoist frame is adapted to be mounted, of transverse bearing means connected with the respective extensions and projecting outwardly therefrom, means connecting said extensions with each other at a level below the level of the vehicle frame upon which the hoist frame is to be mounted, and jacks having bearing means and upon which the jacks are movable pivotally and axially between inoperative and general horizontal positions and operative and general upright positions, together with jack rams extensibly mounted respecting the cylinders, the cylinders having flexible pressure fluid connections for the projection of said rams.

References Cited in the file of this patent

UNITED STATES PATENTS

| | | |
|---|---|---|
| 2,167,026 | Hatch | July 25, 1939 |
| 2,509,950 | Zierke | May 30, 1950 |
| 2,645,360 | Raymond | July 14, 1953 |
| 2,811,386 | Shaw | Oct. 29, 1957 |